Figure 1:
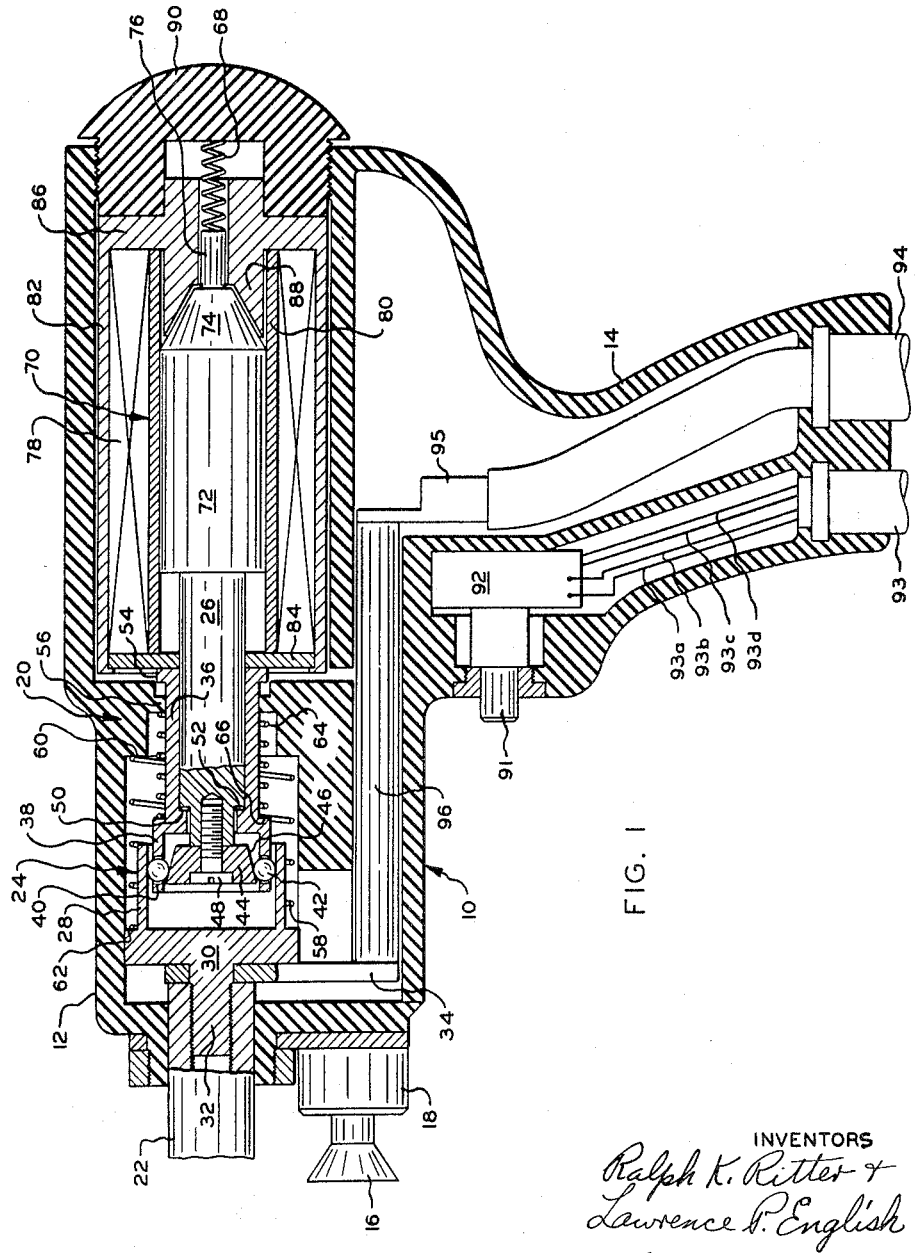

Dec. 22, 1964

R. K. RITTER ETAL 3,162,746

STUD WELDING DEVICES

Filed April 5, 1961

2 Sheets-Sheet 1

INVENTORS
Ralph K. Ritter &
Lawrence P. English
BY Morse & Altman
ATTORNEYS

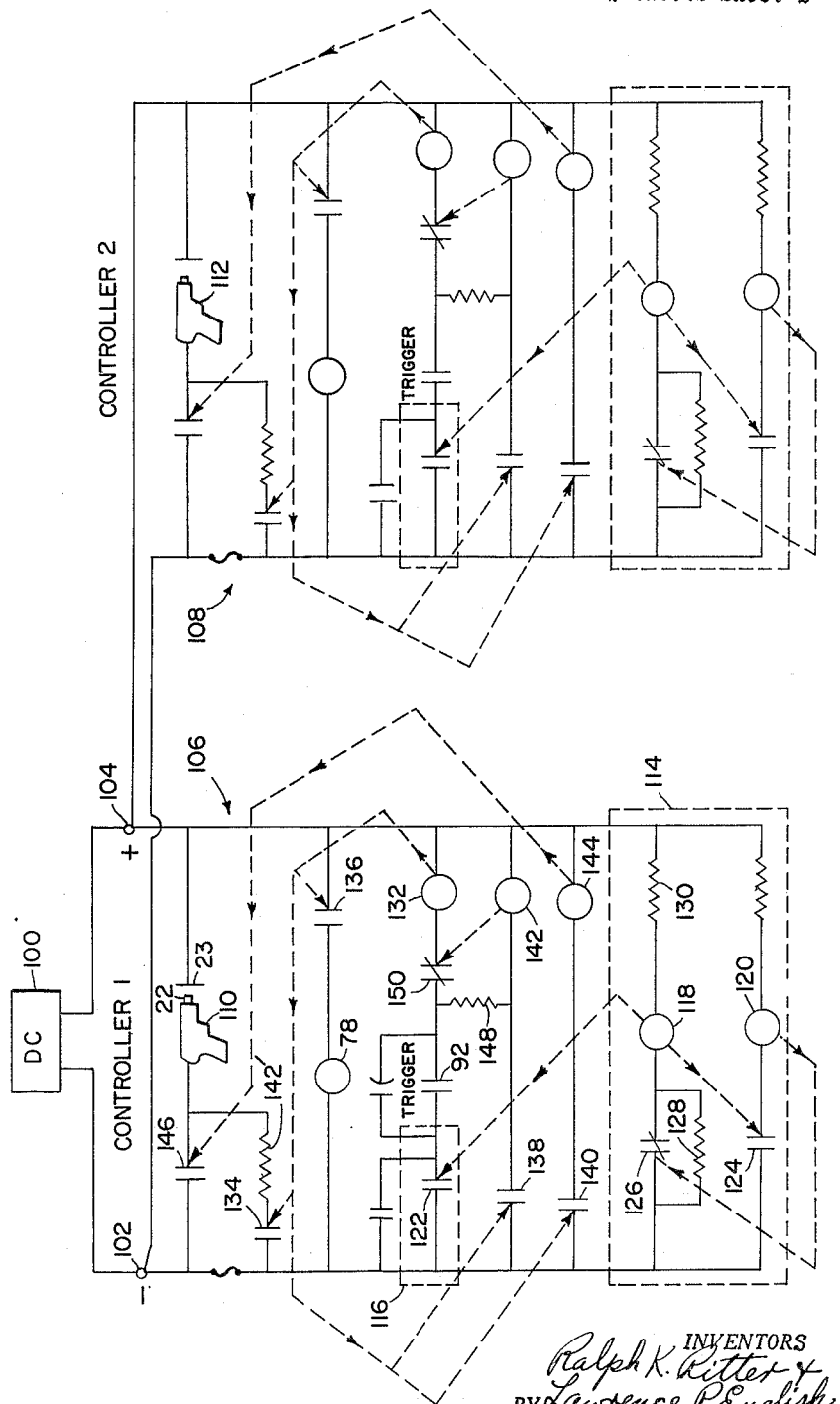

United States Patent Office 3,162,746
Patented Dec. 22, 1964

3,162,746
STUD WELDING DEVICES
Ralph K. Ritter, Moorestown, and Lawrence P. English, Haddon Heights, N.J., assignors to KSM Products Inc., Moorestown, N.J., a corporation of New Jersey
Filed Apr. 5, 1961, Ser. No. 100,907
2 Claims. (Cl. 219—98)

The present invention relates to electric welding and, more particularly, to stud welding devices in one example of which a stud initially is held in contact with a workpiece while a current is passed across the junction therebetween, next is withdrawn from the base to strike a pilot arc, then is maintained at a distance from the base while a welding arc is produced by a current directed across the ionized path established by the pilot arc and finally is plunged against the workpiece in order to unite molten contiguous portions of the stud and the workpiece. Generally, such a stud welding device comprises a hand held gun, a controller of electrical energy imparted to the gun and a power supply for producing such electrical energy. By virtue of the large current involved in welding, it is necessary that the controller be adjacent to the gun. On the other hand, it is often desirable that the power supply be remote from the gun as in the case where two or more widely spaced guns are used in conjunction with a single power supply. A single gun and single controller may be thought of together as a single welding station.

In the case where two or more welding stations are operated from a single power supply, some type of interlocking of the controllers is necessary to prevent simultaneous firing of the two stations. Thus, if the first station has started its welding cycle, the second station must not be permitted to start until the first station has finished. It is possible to arrange the system so that actuation of the trigger of one gun interlocks to open the circuit in the controller for the other gun. In consequence, simultaneous firing is prevented. There are at least two major drawbacks to this system. First, interlocking cable can be a physical problem when the welding stations are far apart. Second, interacting toggle switches or the like may be of questionable dependability.

The present invention contemplates a circuit that eliminates both interlocking cable and interacting toggle switches. This circuit is based upon the utilization of voltage sensitive switches in the controllers which are energized at the relatively high voltage supplied when the power source is open and deenergized at the relatively low voltage supplied when the power source has a load, as when one of the stations is welding. The arrangement is such that when one station is firing the voltage sensitive relay of the other is deenergized.

Accordingly, the primary object of the present invention is to provide a stud welding system comprising a single power source in association with a plurality of stud welding stations. The power source is characterized by a relatively high open circuit voltage and a relatively low closed circuit voltage. In each controller, the power input is controlled by a switch which is closed when the relatively high open circuit voltage of the power source is applied and open when the relatively low closed circuit voltage is applied. Thus initially both voltage sensitive switches are closed and either gun may be fired. However, when one gun is fired the voltage sensitive relay of the other immediately is opened.

Another object of the present invention is to provide a stud welding system of the foregoing type, in which the voltage sensitive relay is permitted to charge to its full voltage drop before being placed in series with a damping resistor by a buffer relay. A further object of the present invention is to provide a control system of the foregoing type in which each of the welding guns includes a solenoid lift and spring return arrangement for controlling the relative positions of the stud and the workpiece.

Other objects of the present invention will in part be obvious and will in part appear hereinafter.

The invention accordingly comprises the apparatus possessing the construction, combination of elements and arrangement of parts which are exemplified in the following disclosure, and the scope of which will be indicated in the appended claims.

For a fuller understanding of the nature and objects of the present invention, reference should be had to the following detailed description, taken in connection with the accompanying drawings wherein:

FIG. 1 is a view, partly in section and partly in elevation of one form of welding gun adapted to constitute a component of the apparatus of the present invention, the section being taken along the main longitudinal axis of the gun; and FIG. 2 is a schematic diagram of a system embodying the present invention.

The system of FIG. 2 serves to energize and control stud welding guns of the semi-automatic pistol type shown in FIG. 1. Generally, the stud welding gun of FIG. 1 is the type described in Patent No. 2,796,513, issued on June 18, 1957 in the name of Frank Kelemen, for "Stud Welding Apparatus." In order to facilitate comprehension of the system of FIG. 2, the gun of FIG. 1 first will be described.

Referring to the drawings, and specifically to FIG. 1, there is shown one form of gun structure especially suited for use with the control circuit of the present invention. As shown, this structure comprises a main housing 10, preferably formed of an electrically non-conducting material, such as plastic, for example, of the thermosetting phenolic type. Housing 10 comprises a generally cylindrical barrel 12, and, in its preferred form, a handgrip or handle 14, and is preferably formed of two or more sections so that it can be easily disassembled to permit ready access to the operating elements contained therein. Slidably mounted in barrel 12, preferably beneath the main longitudinal axis thereof and symmetrically arranged with respect to the plane of this axis, is leg member 16. This is mounted for ready adjustment to any desired length, and suitable means (not shown) manually operable from the exterior of the gun, as by means of a nut 18, is provided for fixing leg member 16 against inadvertent movement.

Barrel 12 is provided with a main longitudinal bore open at both ends and has an intermediate inwardly extending section 20 which separates the bore into essentially two chambers, slidably mounted in the front open end of the barrel are a stud holder means 22, which may comprise a chuck adapter, a chuck and a spring and which operatively mounts the stud, and a suitable arc shield. The stud is fixed in stud holder 22 so as to be movable therewith. Movably mounted in the chamber between section 20 and the front end of gun barrel 12 is a novel connecting mechanism 24 which is adapted to connect together stud holder 22 and a suitable lifting member 26. As shown, mechanism 24 comprises a ball-engaging barrel 28 which is preferably integrally formed with and extends rearwardly from a screw member 30. The threaded shank 32 of screw member 30 is screwed into a threaded bore provided for it in stud holder 22. Members 30 and 22 are formed of conducting material, preferably a metal such as steel, and barrel 28 is suitably heat-treated so that its internal surface has excellent wear resistance. Clamped between the forward wall of the head of screw member 30 and the end of stud holder 22 is a welding current conductor 34 which is suitably connected to the source of welding current by means to be more fully described hereinafter.

Slidably mounted for movement substantially coaxially with stud holder 22 and lifting member 26 is a sleeve 36 biased in plunge direction and provided with a forward cylindrical portion 38 of enlarged diameter. Portion 38 is equipped with a plurality of recesses 40 and serves as a cage to operatively mount a plurality of balls 42 in the recesses. Two balls have been shown in FIG. 1 in order to illustrate that a plurality of such balls are carried by the cage 38 and that these balls are equally spaced around the periphery of the cage to provide a uniform distribution of the lifting forces exerted thereby when in operation. Three balls 120° apart constitute a preferred arrangement. Ball cage 38 has an outer diameter which is sufficiently smaller than the internal diameter of the ball-engaging surface of barrel 28, within which it fits, to preclude any appreciable surface contact. And the internal diameter of the rear portion of sleeve 36 is sufficiently larger than the external diameter of the portion of lifting member 26, which it surrounds, to prevent any appreciable frictional engagement therebetween.

Rigidly mounted on the forward end of lifting member 26 is a ball-engaging member 44 provided with a tapered ball-engaging peripheral surface 46, the diameter of this surface decreasing in the direction of the lifting member. Member 44 may be secured to or integrally formed with lifting member 26 and, as shown, a screw 48 extending through member 44 and threaded into the end of member 26 effects the desired union between the members.

Balls 42 are adapted to be engaged by tapered surface 46 when the latter is moved in lift direction relative to cage 38 and this engagement forces the balls radially outwardly into engagement with the internal surface of barrel 28. This tends to lock together the ball-engaging members 44 and 28 and the elements secured thereto, namely, lifting member 26 and stud holder 22 and renders mechanism 24 operative.

An internal shoulder 50 is formed in the forward end of sleeve 36 adjacent to cage 38 and is adapted to engage a shoulder 52 in the forward end of member 26 to provide a stop for the movement in plunge direction of lifting member 26 relative to sleeve 36. At the rear end of sleeve 36, an outwardly extending flange 56 in intermediate section 20 of the housing in its movement in plunge direction. Flange 56 fixes the foremost position of sleeve 36 relative to housing 10.

A main spring 58 normally biases member 30 and stud holder 32 in a plunge direction, the spring being held under compression between a shoulder 60 provided by intermediate section 20 of the housing and a shoulder 62 of member 30.

In a preferred form of the connecting mechanism, when shoulders 50 and 52 are in engagement, mechanism 24 is inoperative, i.e. balls 42 are inoperative to effect frictional engagement between barrel 28 and member 44. Thus, so long as shoulder 52 is held in engagement with shoulder 50, barrel 28 and hence stud holder 22 is free for movement in either direction relative to lifting member 26. A spring 64, located between internal shoulder 56 and an external shoulder 66, provided by the base of ball cage 38, normally biases sleeve in a plunge direction. A further spring 68, which exerts a sufficient biasing force upon lifting member 26 to overcome the weight thereof urges lifting member 26 in a plunge direction so that normally shoulder 52 engages shoulder 50 and maintains connecting mechanism 24 inoperative.

Suitable means are provided in the gun structure to apply a lifting force to member 26. In the form shown, this means comprises solenoid 70. Lifting member 26 is the movable core of the solenoid and includes a portion 72 of enlarged diameter, a tapered portion 74 and a rear portion 76 of diminished diameter. Surrounding movable core 26 is the solenoid coil 78, which is housed in a metallic structure comprising an internal cylindrical sleeve 80, for example of brass, an external sleeve 82, for example of steel, a front plate 84, rear wall 86 and a stationary core 88. Stationary core 88, rear wall 86 and outer sleeve 82 may be integrally formed and this integral structure is preferably provided with an internal bore that slidably receives core portion 76.

A cap member 90 threads into the opening at the rear of gun barrel 12, member 90 being preferably formed of an electrically non-conducting material as, for example, the same plastic material from which the gun housing is formed. Spring 68 which biases movable core 26 in a plunge direction is preferably mounted between the end of reduced portion 76 of the movable core and the inner wall of cap 90. Cap 90 is preferably secured to stationary core 88 and rear wall 86 so that the cap, the stationary core, wall 86 and sleeve 82 move as a unit. However, plate 84, inner sleeve 80 and solenoid coil 78 are free to move angularly with respect to the remainder of the solenoid housing but are restrained by outer sleeve 82 so as to move axially along with the outer sleeve. Plate 84 abuts against one end of inner sleeve 80 and the other end of the sleeve abuts against wall 86 so that the axial position of the front surface of plate 84 is precisely fixed in the gun housing in relation to the stationary core 88 of the solenoid and the axial position of plate 84 may be controlled by adjusting the position of cap 90. By mounting plate 84 and solenoid coil 78 so that the latter is not rotated along with sleeve 82, adjustment of cap 90 leaves unaffected the electrical connections which are made to the solenoid coil through plate 84 despite the rotation of sleeve 82.

To precisely control the lift of the stud and prevent over-travel of stud holder 22 relative to lifting member 26, sleeve 36 is so formed and mounted in relation to lifting member 26 and stationary core 88 that, during the lift, the end of sleeve 36 engages plate 84 and core 74 engages stationary core 88. It is to be observed that adjustment of the total lift may be obtained by adjusting the position of plate 84 by means of cap 90 but that such adjustment does not affect the aforementioned sequence of operations because the axial position of plate 84 is fixed relative to the axial position of stationary core 88. By having sleeve 36 engage and be positively stopped before lifting member 26 engages any stop, the stopping force is transmitted through the sleeve to balls 42 in a direction that tends to augment the wedging action between the plate-engaging surfaces of elements 44 and 24. Stud holder 22 is thus rigidly secured through member 30, balls 42 and member 44 to lifting member 26 and any overtravel of holder 22 relative to member 26 is prevented.

Disposed in handgrip 14 of the housing, in a position to be readily engaged by the finger of the gun operator, is a trigger in the form of a push button 91 which, when depressed, is adapted to actuate a control switch 92. A pair of electrical cables 93 and 94 preferably extend through the bottom of the handgrip into the housing to effect the necessary electrical connections. Cable 94 provides the welding current and is connected by a connector element 95 to a conducting rod 96 which in turn is affixed to and makes contact with conductor 34. The structure comprising conductor 34, rod 96 and connector 95 is freely movable longitudinally of the gun barrel 12 along with stud holder 22, cable 94 being sufficiently flexible and having enough play in the gun handle to permit such free movement. Cable 93 carries four control wires 93a, 93b, 93c and 93d, wires 93a and 93b being connected to switch 92 and wires 93c and 93d extending upwardly through the gun housing to connect with solenoid coil 78 through plate 84.

The gun FIG. 1 is shown in lift position with flange 54 engaging plate 84 and mechanism 24 locked in operative position. However, at the beginning of the stud welding cycle, stud holder 22 is in its foremost position in plunger direction, being held in this position by the pressure of spring 58. Under the influence of spring 64, sleeve 36 and the balls carried thereby are also urged into their foremost position in plunge direction. Similarly, lifting member 26 is biased by spring 58 in this same direction and, as noted hereinabove and because of the engagement of shoulders 50 and 52, connecting mechanism 24 is inoperative to effect engagement between member 44 and barrel 28. In this position, therefore, stud holder 22 is free to be moved axially against the bias of spring 58 and is so displaced initially as the stud and arc shield held by holder 22 are positioned in engagement with the base or workpiece to which the stud is to be secured. Thereafter, by depressing trigger 91 the welding cycle is begun and the energization of solenoid 78 moves members 26 in a lift direction while sleeve 36 continues to be biased in plunge direction by its spring 64. As a result, when lifting member 26 has moved a predetermined, constant short distance in lift direction, balls 42 frictionally engage and are wedged between the surface 46 of member 44 and the internal surface of barrel 28. This locks together lifting member 26 and stud holder 22 and begins the lift of the latter. The lift is terminated when the end of flange 54 of sleeve 36 abuts against plate 84 and renders more positive the locking engagement between the stud holder 22 and the lifting member 26. The elements are so held as long as solenoid 78 remains energized.

Upon the deenergization of the solenoid coil, stud holder 22, sleeve 36 and lifting member 26 are moved in a plunge direction under the influence of their respective springs and the stud held by the holder is plunged into engagement with the body member, completing the weld cycle.

Referring now to FIG. 2, there is shown a system comprising a D.C. current source 100 characterized by a relatively high voltage when unloaded and a relatively low voltage when loaded and having a pair of terminals 102 and 104 as a result of internal impedance. Connected in parallel across terminals 102 and 104 are a pair of controllers, the first being designated 106 and the second being designated 108. Fed by controllers 106 and 108 are a pair of stud welding guns of the type shown in FIG. 1, the first being designated 110 and the second being designated 112. First controller 106 and second controller 108 are identical in all respects. For clarity, only the components of first controller 106 are numbered.

Generally, the voltage responsive circuit of first controller 106 is shown within the dotted lines designated 114 and 116 as comprising a first relay coil 118 and a second relay coil 120, which is operated thereby. If this voltage responsive circuit were not required to be as responsive as it must, one relay in each controller would provide a satisfactory interlock. However, two relays are desirable for the following reason. Because of many different existing welding machine designs and the wide range of welding power requirements, the voltage responsive relay must energize at a potential that is relatively low, and must deenergize at a potential that is relatively high. Therefore, a second coil is provided to allow the first coil to fully energize rapidly before being placed in series with a voltage regulating resistor. When D.C. source 100 is actuated, an open circuit voltage is applied between terminals 102 and 104. This voltage, which is relatively high, energizes first relay coil 118. In consequence, normally open contact points 122 and 124 close. The closing of contact points 124 energizes relay 120 and normally closed contact points 126 open. In consequence, a resistor 128 is introduced, in addition to a resistor 130, serially with relay coil 118. When normally open contact points 122 are closed, trigger switch 92 (bearing the same designation as its mechanical counterpart in FIG. 1) is placed across terminals 102 and 104. As indicated above, controllers 106 and 108 are identical to each other. Accordingly, although only the operation of controller 106 has been described, controller 108 has operated similarly. Therefore, at this time both guns 110 and 112 are ready to weld.

Now if trigger switch 92 of first controller 106 is closed, a trigger relay coil 132 is energized to close normally open contact points 134, 136, 138 and 140. Contact points 134 close in order to effect connection through a ballast resistor 142 across terminals 102 and 104 of the source of welding current to provide a pilot arc from the stud to the workpiece. At the same time contact points 136 are closed, supplying D.C. current to solenoid coil 78 to initiate the lift of stud 22. Simultaneously contact points 138 and 140 are closed, contact points 138 energizing a timer relay 142 and contact points 140 energizing a welding current relay coil 144. Welding current relay coil 144 closes normally open contact points 146, shorting resistor 142' to apply the full welding current between stud 22 and the workpiece, shown at 23.

In consequence of the flow of welding current, the voltage between terminals 102 and 104 drops. At the reduced voltage, relay coils 118 in both controller 106 and 108 deenergize, opening their contact points 122 and 124. Since contact points 122 are in series with triggers 92, the second gun cannot weld. However, the first gun can continue to weld since contact points 138 interlock the trigger through a resistor 148. When relay coil 142 times out, welding current is interrupted by the opening of normally closed contact points 150. Now voltage rises to open circuit voltage between terminals 102 and 104 so that relay coils 118 again become energized to close contact points 122 and 124 once again.

In operation, therefore, both guns are ready to fire in consequence of the operation of both controllers which are connected in parallel across terminals 102 and 104 of direct current source 100. However, when the gun of one of the stations is fired, the voltage across terminals 102 and 104 is reduced by virtue of the load applied and the voltage sensitive relay of the controller of the other of the stations prevents its associated gun from being fired.

It will be apparent that the system of FIG. 2 may be used in conjunction with forms of guns other than that shown in FIG. 1. Although only two stations are illustrated in FIG. 2, it will be apparent that three or more stations may be connected across terminals 102 and 104. It is to be understood that alternative voltage sensitive relay systems are within the scope of the present invention.

Since certain other changes may be made in the illustrated system without departing from the scope of the invention herein involved, it is intended that all matter contained in the above description or shown in the accompanying drawing shall be interpreted in an illustrative and not in a limiting sense.

What is claimed is:

1. Welding apparatus comprising a direct current power source and a plurality of stud welding stations, said power source supplying a substantially predetermined relatively high voltage to said stud welding stations when said stud welding stations are not in operation and supplying a substantially predetermined relatively low voltage to said welding stations when one of said stud welding stations is in operation, each of said stud welding stations including a stud welding gun having a reciprocable stud holder for carrying a stud, a spring arrangement for biasing said stud outwardly with respect to said stud welding gun toward a workpiece, a solenoid for withdrawing said stud holder inwardly with respect to said stud welding gun away from said workpiece, a first path constituting a voltage sensitive interlock including a voltage sensitive relay coil and a normally open switch in series across said power source, a second path constituting a buffer interlock including a normally closed switch, a relay coil and a resistor in series across said power source and a resistor connected in parallel across said normally closed switch of said second path, a third path constituting a stud welding current flow control including a normally open switch and a relay coil in series across said power source, and stud welding gun operating means including a manually engageable trigger that initiates energizing said solenoid, generating a pilot arc between said stud and said workpiece, and actuating said stud welding current flow control and deenergizing said solenoid in order to plunge said stud toward said workpiece, said relay coil of said buffer interlock of said second path preventing operation of said stud welding gun operating means when said voltage is relatively low and permitting operation of said stud welding gun operating means when said voltage is relatively high.

2. The welding apparatus of claim 1 wherein said stud gun operating means comprises a fourth path constituting a trigger interlock including a normally open switch and a relay coil in series across said power source, a fifth path constituting a trigger switch including a first normally open switch, a second normally open switch, a normally closed switch and a relay coil, in series across said power source, said manually engageable trigger constituting said second normally open switch of said fifth path, a sixth path constituting a gun solenoid control including said solenoid and a normally open switch in series across said power source, said stud holder being connected to the negative terminal of said power source through a normally open switch in series therewith, a normally open switch and a resistor connected across said normally open switch in series with said stud holder, the positive terminal of said power source being adapted for connection to said workpiece, said relay coil of said first path being operatively connected to said normally closed relay of said second path, said relay coil of said first path being operatively connected to said normally closed relay of said second path, said relay coil of said second path being operatively connected with said normally open switch of said first path and said normally open switch of said fifth path, said relay coil of said third path being operatively connected with said normally open switch in series with said stud holder, said relay coil of said fourth path being operatively connected with said normally closed switch of said fifth path, said relay coil of said fifth path being operatively connected to said normally open switch of said sixth path, said normally open switch of said fourth path, said normally open switch of said third path and said normally open switch connected across said normally open switch in series with said holder.

References Cited in the file of this patent

UNITED STATES PATENTS

| | | |
|---|---|---|
| 1,551,400 | Jones | Aug. 25, 1925 |
| 1,787,278 | Lum | Dec. 30, 1930 |
| 2,265,270 | Dawson | Dec. 9, 1941 |
| 2,305,773 | Hagedorn | Dec. 22, 1942 |
| 2,315,958 | Hill et al. | Apr. 6, 1943 |
| 2,771,570 | Flubacker | Nov. 20, 1956 |
| 2,787,740 | Helmert | Apr. 2, 1957 |
| 2,796,513 | Kelemen et al. | June 18, 1957 |
| 3,051,825 | Rockafellow et al. | Aug. 28, 1962 |